United States Patent [19]
Kreis et al.

[11] Patent Number: 5,383,987
[45] Date of Patent: Jan. 24, 1995

[54] CAST AND ASSEMBLY METHOD FOR MOTOR VEHICLE BODYWORK

[75] Inventors: Gundolf Kreis, Oberstimm; Heinrich Timm, Ingolstadt; Norbert Enning, Denkendorf; Robert Spies, Ingolstadt, all of Germany

[73] Assignee: Audi A.G., Ingolstadt, Germany

[21] Appl. No.: 75,600

[22] PCT Filed: Nov. 8, 1991

[86] PCT No.: PCT/EP91/02117

§ 371 Date: Jun. 16, 1993

§ 102(e) Date: Jun. 16, 1993

[87] PCT Pub. No.: WO92/11170

PCT Pub. Date: Jul. 9, 1992

[30] Foreign Application Priority Data

Dec. 20, 1990 [DE] Germany ............ 4041022

[51] Int. Cl.⁶ ............................................. B32B 31/04
[52] U.S. Cl. ............................. 156/60; 156/244.11; 156/293; 296/29; 296/185; 296/196; 296/203; 296/205
[58] Field of Search .............. 156/60, 244.11, 293; 296/29, 185, 193, 196, 203, 205

[56] References Cited

U.S. PATENT DOCUMENTS

| 5,085,485 | 2/1992 | Wurl | 296/205 |
| 5,092,649 | 3/1992 | Wurl | 296/185 |
| 5,094,504 | 3/1992 | Wurl | 296/185 |
| 5,112,102 | 5/1992 | Wurl | 296/194 |
| 5,195,779 | 3/1993 | Aoyama et al. | 296/203 |

FOREIGN PATENT DOCUMENTS

| 0146716 | 12/1988 | European Pat. Off. . |
| 556458 | 7/1923 | France . |
| 3413228 | 10/1985 | Germany . |
| 3737212 | 5/1989 | Germany . |
| 228070 | 1/1990 | Japan . |
| 868577 | 5/1961 | United Kingdom . |
| 941164 | 11/1963 | United Kingdom . |

Primary Examiner—Caleb Weston
Attorney, Agent, or Firm—Jacques M. Dulin

[57] ABSTRACT

A cast light metal joining element and method of assembly with adjoining extruded light metal hollow section bearer member of a space frame type vehicle body. The joining element or casting includes at least two spaced apart, location points disposed along a surface wall thereof. The location points permit the casting to be held in a corresponding fixture at a desired positionally correct spatial orientation to facilitate the fitting and connection of adjoining frame elements with greater ease, accuracy and smaller tolerances. In one embodiment, the location points include integrally formed conical studs and/or conical depressions. In another embodiment, the location points include through-holes, either straight cylindrical or conically tapered. The studs, depressions and/or holes also served a dual function in providing a positive locking connection to add on components which have corresponding matingly engagable connection surfaces.

18 Claims, 1 Drawing Sheet

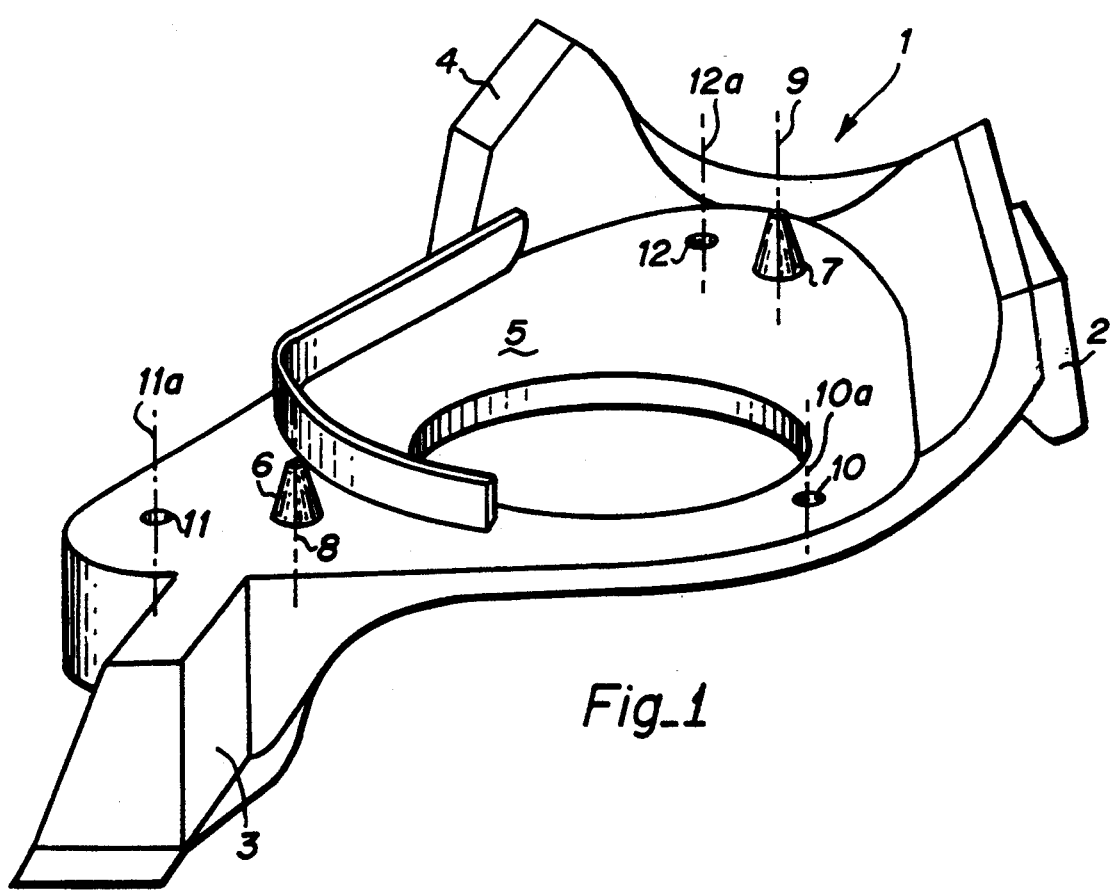
Fig_1

CAST AND ASSEMBLY METHOD FOR MOTOR VEHICLE BODYWORK

FIELD

The present invention relates to improvements in motor vehicle bodywork fabrication, and more particularly to an improved junction element in a vehicle bodywork of the type having a space frame bearing structure assembled from a plurality of hollow section frame members joined together by junction elements.

BACKGROUND

Customary self-supporting vehicle bodies for passenger vehicles, including the associated supporting structure, are manufactured from sheet-metal parts. The bearer members which have hollow profiles are formed by welding together two deep-drawn metal sheets or stampings. The bearer joints which form the connection of two bearers are typically formed by overlapping adjacent bearer ends and joining them at the points of contact with a weld seam or several spot welds.

The steel sheets used to construct such self-supporting vehicle bodyworks are typically shaped in a deep drawing process. While the dies used for shaping the steel sheets are relatively expensive, they do provide a cost-favorable solution for mass production since they permit large production runs. However, in view of the high investment costs for tooling, the aforesaid process is very cost-intensive for smaller production runs.

A more cost-favorable solution for small production runs is known, for example, from European Patent document EP 0 146 716. This document discloses a "space frame" type bearing structure for a passenger car body which comprises a plurality of hollow section frame members joined together by nodes or junction elements. The hollow section frame members are formed as extruded light-metal sections, typically high grade aluminum alloy, and the junction elements are formed as light-metal castings. In addition to being a more cost-favorable solution for small production runs, a light-alloy bodywork of the type disclosed in EP 0 146 716 weighs less and offers improved corrosion resistance as compare to a conventional sheet metal bodywork.

Such cast light metal junction elements typically have very complex surface configurations and include variable wall thicknesses, and/or reinforcing ribs for added stiffness as well as complex curved regions for making suitable transitions with even force distribution to the adjoining extruded hollow section frame members.

With such three-dimensionally complex structures, however, problems arise in: (1) design; (2) the production of the patterns and molds; (3) checking or tolerance verification operations; and above all; (4) the final assembly of the finished joint. The above problems are due to the fact that there is no suitable and reproducible, geometrically simple basic structure on the basis of which the design of, dimensioning, checking and adjustment or tweaking can be carried out.

For a body superstructure with narrow tolerances, it is difficult to arrange the complex-shaped junction elements in the correct position in space and to assign the connecting extruded sections to them. This is due to the unusually complicated geometry of the junction elements, which generally do not have any surfaces well suited for positionally correct mounting in an assembly device or jig. In addition, in view of the complex geometry, checking for dimensional accuracy of the parts is made difficult, thus making it necessary to accept relatively large tolerances.

It is known from French Patent Document FR 556 458 A how to releasably connect two flat components on a vehicle by a central bolt, whereby the mating surfaces of the two components have interengaging conical raised portions and correspondingly shaped depressions. The described engagement method provides an aid to adjustment and an anti-rotation safeguard. No reference, however, is made to assembly of a vehicle body from junction elements and hollow sections.

A method for the production of a vehicle body is furthermore known from German Patent Document DE 3 413 228 A1 in which the initial assembly of the vehicle body is completed without a center pillar and is fully painted. In this way, interior fittings may be introduced into the passenger compartment via the side cut-out where the center pillar would normally be disposed. Once the interior fittings have been installed, the center pillar is then inserted and connected to the vehicle body. This connection is made via a conical plug-in connection. This document, however, does not teach or suggest a three dimensional positionally correct alignment of junction elements within an assembly device.

British Patent Document GB 941 164 discloses a substructure of a vehicle body wherein a forwardly disposed transverse member is joined along each end thereof via upwardly curved bridging members to a respective one of a pair of parallel, spaced apart longitudinal frame members. The transverse member and the longitudinal members lie in parallel horizontal planes. The mating surfaces between the ends of the transverse member and the curved bridging members include upraised bosses and corresponding recesses to facilitate releasable engagement and orientation of the curved bridging member for final connection with the associated longitudinal member. This document does not teach or suggest a method for fixing a junction element in space to assist in the assembly of a plurality of adjoining frame elements thereto.

THE INVENTION

Objects

It is therefore an object of the invention to provide a method for assembly of a vehicle body having a space frame type bearing structure which comprises hollow section members interconnected by junction elements which is simple to carry out and results in dimensionally accurate vehicle bodies.

It is another object of the invention to provide a joining element in the form of a cast component which includes a plurality surface configurations formed thereon which serve as datum points for fixing the cast component in an assembly device or jig in a desired spatial orientation for positionally correct connection of adjoining frame elements with small tolerances.

Other and further objects will become evident from the following written description, drawings and appended claims.

DRAWINGS

An exemplary embodiment of the invention with further details, features and advantages is best understood with reference to the drawings in which:

FIG. 1 shows an isometric view of a cast component in the form of a suspension strut mount.

SUMMARY

According to the invention, the joining elements are in the form of light metal castings and have at least two spaced apart, master points in the form of integrally formed raised portions and/or integrally formed depressions provided on a wall surface thereof. The castings are held in the correct position in space by way of the master points by clamping into a measurement fixture or holding in an assembly device or jig during assembly. Extruded section frame members are then joined to the castings by welding or adhesive bonding.

Dependent upon these master points, the dimensioning is accomplished, whereby the master points represent appropriate datum points. At the same time, through their shape as integrally formed raised portions and/or integrally formed depressions, registration is possible, for example, for clamping into a measurement fixture or for holding during assembly.

The master points advantageously aid in the construction of the model for the cast component, since the model, beginning from the master points, is set in its shape and thus, despite complex contours, is simple to manufacture. Similarly, the manufacture of the casting tools is simplified, whereby the measurement of the casting tools, beginning from the master points, can be well controlled.

Also, once the master points have been entered into the measurement fixture, the finished castings can be simply measured and controlled, even in the case of very irregular shapes.

Further, in the case of bodywork repair, it is possible to use the master points to measure with relative ease the bodywork joint elements.

The master points of the present invention thus result in substantial advantages for model construction, tool construction, and in control and measurement work. The master points can, however, also advantageously assist the assembly, whereby such a casting is held in the correct position in space by way of the master points until finally joined to the extruded sections by welding or adhesive bonding.

In another advantageous embodiment of the present invention's cast components, the master points, when configured as raised portions or depressions, may be used to facilitate positive engagement with additional add-on parts having corresponding engaging surfaces. This results in positively engaged force transmissions, whereby tensional peaks can be reduced by a homogeneous introduction of force. In such positively engaged junctions, respectively concave or convex formed parts interlock in the region of the master points.

In another embodiment of the invention, three assigned master points defining a triangular area are provided. The three master points define an area on the cast component from which all the relative arrangements required for correct positioning in space are possible. In the case of a multi-surface cast component, such a triangular area, defined by master points, is expediently also placed in this plane. In the case of castings of complex design, however, further master points may also be expedient.

In a particularly preferred embodiment, the master points are designed as conical studs. With such studs, a cast component can be fixed and centered in a simple manner in an assembly device. Force transmission with positive engagement can also be carried out in a simple manner by virtue of such studs since the force-transmitting surfaces come into play-free contact due to the conical structure. Ease of removal from the mold is likewise guaranteed.

The cone axes of the conical studs preferably all point in the same direction in space in accordance with the direction of attachment. In this way, the casting can be held in a corresponding assembly device in a simple manner.

In one embodiment of the invention, the master points, embodied as integrally formed depressions, are cylindrical holes. These holes can also penetrate the casting wall, thereby allowing them to serve the additional function of receiving screw fasteners.

In another embodiment of the invention, the depressions are designed as conically tapered holes similar to the conical studs, being the negative form of the latter. Here, too, this gives the corresponding advantages for fixing and centering and force transmission with positive engagement if the counterparts are of correspondingly conical design.

As with the embodiment of the master points as conical studs, it is advantageous to align the central longitudinal axes of the holes in the same direction in space to ensure that the parts can be fitted together easily.

The master points are preferably provided on suitably stiff and strong regions of the casting. For this purpose the casting may be selectively reinforced by added wall thickness and/or supporting ribs. This guarantees good dimensional stability of the master points relative to one another.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

FIG. 1 shows a casting or cast component 1 embodied as a front suspension strut mount. This cast component 1 is representative of one type of junction element of the supporting structure of a vehicle body. The casting preferably comprises a light-metal alloy. In the present example, the casting 1 includes three lateral shoulders 3, 4, 5 to which aluminum extruded sections (not shown) are connected to construct the supporting structure. The central portion 5 is arched somewhat upwards in a cup shape and serves as a support and attachment for a suspension strut (not shown) which is placed against it from below after final assembly.

As is evident from FIG. 1, the casting 1 when embodied as a suspension strut mount is of relatively irregular and complex design in order to satisfy the requirements for attachment of the adjoining light-metal extruded sections, including the desired stiffness characteristic and smooth force transmission for the resulting joint.

Two spaced-apart conical studs 6 and 7 are provided in a upper surface as master points. The conical studs 6 and 7 include cone axes 8 and 9, respectively, which preferably are aligned in parallel, approximately vertical axes.

The studs 6 and 7 represent datum points by which adjustment and orientation in a desired spatial position may be accomplished by fixture in a suitable assembly device such as, for example, clamping the datum points to corresponding receiving conical depressions of a provided jig. Once the casting 7 is fastened at the master points in the desired spatial orientation, it is a simple matter to verify the tolerances and related measuring/checking procedures.

In an alternate embodiment, the datum points may comprise a plurality of integrally formed depressions or holes. FIG. 1 shows three holes 10, 11, 12, approximately defining a triangular area, on the casting. The holes 10, 11 and 12, also have central longitudinal axes, indicated by their respective reference numerals 10a, 11a and 12a, all of which preferably point in the same direction in space. These holes 10, 11, 12 are also preferably formed integral within the casting 7 from the outset and represent master points. The holes 10–12 may be either cylindrical or conically tapered as desired.

In both embodiments, the studs 6, 7 and the holes 10, 11, 12 are preferably situated in thick-walled or ribbed reinforced regions of the casting 1.

As an be seen, without the studs 6, 7 and/or the holes 10, 11, 12, the irregular shape of the casting 1 would make it difficult to adjust and fix the casting 1 in space, for example to connect the light-metal extruded sections. In yet another embodiment the three holes can be replaced by three or more conical studs.

In the present case, the holes 10, 11, 12, embodied as master points, can simultaneously also be used as seats for the screwed fasteners by means of which the suspension strut is fastened. Further connecting parts can also be positioned over and screwed down on the studs 6 and 7 with positive engagement and in a centered manner described above thereby providing good force transmission with positive engagement and reduced stress peaks in addition to the screwed-in components.

It should be understood that various modifications within the scope of this invention can be made by one of ordinary skill in the art without department from the spirit thereof. For example, while the datum points have been described as consisting of either all studs or all holes, it is understood that a combination of studs and holes may be used as desired. We therefore wish our invention to be defined by the scope of the appended claims as broadly as the prior art will permit, and in view of the specification if need be.

PARTS LIST

1. Suspension strut mount
2. Shoulder
3. Shoulder
4. Shoulder
5. Central portion
6. Conical stud
7. Conical stud
8. Core axis
9. Core axis
10. Hole
11. Hole
12. Hole

We claim:

1. A method of assembly of a vehicle bodywork having a space frame bearing structure of the type in which cast light metal junction elements are used to join a plurality of extruded light metal hollow section frame members, said assembly method comprising the steps of:
   a) providing a cast light metal junction element having a plurality of connector portions for joining a plurality of converging extruded light metal hollow section frame members and including at least one wall surface having a plurality of spaced apart datum points thereon;
   b) clamping said cast light metal junction element to a fixture at said datum points so that said cast light metal junction element is held at a desired spatial orientation;
   c) securing each of said plurality of said extruded light metal hollow section frame members to their corresponding connector portions of said cast light metal junction element; and
   d) unclamping said cast light metal junction element from said fixture.

2. A vehicle bodywork assembly method as in claim 1 wherein said datum points comprise three master points disposed in triangular orientation on said cast light metal junction element.

3. A vehicle bodywork assembly method as in claim 2 wherein said master points comprise upraised conical studs.

4. A vehicle bodywork assembly method as in claim 3 wherein:
   a) said cast light metal junction element includes reinforced wall thickness regions to provide for improved stiffness; and
   b) said reinforced wall thickness regions are disposed adjacent said conical studs.

5. A vehicle bodywork assembly method as in claim 3 wherein:
   a) each of said conical studs has a central longitudinal axis; and
   b) said central longitudinal axes of said conical studs are parallel to one another.

6. A vehicle bodywork assembly method as in claim 5 wherein:
   a) said cast light metal junction element includes reinforced wall thickness regions to provide for improved stiffness; and
   b) said reinforced wall thickness regions are disposed adjacent said conical studs.

7. A vehicle bodywork assembly method as in claim 2 wherein said master points comprise cylindrical holes.

8. A vehicle bodywork assembly method as in claim 7 wherein:
   a) said cast light metal junction element includes reinforced wall thickness regions to provide for improved stiffness; and
   b) said reinforced wall thickness regions are disposed adjacent said cylindrical holes.

9. A vehicle bodywork assembly method as in claim 7 wherein:
   a) each of said cylindrical holes has a central longitudinal axis; and
   b) said longitudinal axes of said cylindrical holes are parallel to one another.

10. A vehicle bodywork assembly method as in claim 9 wherein:
    a) said cast light metal junction element includes reinforced wall thickness regions to provide for improved stiffness; and
    b) said reinforced wall thickness regions are disposed adjacent said cylindrical holes.

11. A vehicle bodywork assembly method as in claim 2 wherein said master points comprise conically tapered holes.

12. A vehicle bodywork assembly method as in claim 11 wherein:

a) said cast light metal junction element includes reinforced wall thickness regions to provide for improved stiffness; and
b) said reinforced wall thickness regions are disposed adjacent said conically tapered holes.

13. A vehicle bodywork assembly method as in claim 11 wherein:
a) each of said conically tapered holes has a central longitudinal axis; and
b) said central longitudinal axes of said conically tapered holes are parallel to one another.

14. A vehicle bodywork assembly method as in claim 13 wherein:
a) said cast light metal junction element includes reinforced wall thickness regions to provide for improved stiffness; and
b) said reinforced wall thickness regions are disposed adjacent said conically tapered holes.

15. A vehicle bodywork assembly method as in claim 1 wherein said datum points comprise upraised conical studs.

16. A vehicle bodywork assembly method as in claim 15 wherein:
a) said cast light metal junction element includes reinforced wall thickness regions to provide for improved stiffness; and
b) said reinforced wall thickness regions are disposed adjacent said conical studs.

17. A vehicle bodywork assembly method as in claim 15 wherein:
a) each of said conical studs has a central longitudinal axis; and
b) said central longitudinal axes of said conical studs are parallel to one another.

18. A vehicle bodywork assembly method as in claim 17 wherein:
a) said cast light metal junction element includes reinforced wall thickness regions to provide for improved stiffness; and
b) said reinforced wall thickness regions are disposed adjacent said conical studs.

* * * * *